United States Patent [19]

Richer

[11] Patent Number: 5,003,585
[45] Date of Patent: Mar. 26, 1991

[54] SYSTEM FOR THE PAYMENT OF TELEPHONE CALLS IN A PRIVATE SELF-SWITCHING UNIT

[76] Inventor: Louis Richer, La Salmoniere, 35510 Cesson-Sevigne, France

[21] Appl. No.: 180,974

[22] Filed: Apr. 11, 1989

[30] Foreign Application Priority Data

Jul. 18, 1986 [FR] France ................. 86 10591

[51] Int. Cl.$^5$ ............ H04M 1/66; H04M 15/16; H04M 17/00
[52] U.S. Cl. ............................ 379/144; 379/155
[58] Field of Search ............ 379/144, 155, 157, 189, 379/200, 199

[56] References Cited

U.S. PATENT DOCUMENTS 3,870,866  3/1975  Halpern ................. 379/144
4,045,619  8/1977  Harrington ............ 379/200

Primary Examiner—Stafford D. Schreyer
Attorney, Agent, or Firm—Laff, Whitesel, Conte & Saret

[57] ABSTRACT

A telephone system uses a badge which contains electronically stored data including information about prepaid credits. When a call is made, data is read from and into the badge to leave a credit balance standing in the badge after the charges for a call have been deducted.

3 Claims, 3 Drawing Sheets

SYSTEM FOR THE PAYMENT OF TELEPHONE CALLS IN A PRIVATE SELF-SWITCHING UNIT

The present invention relates to an automatic payment system for telephone calls made, especially, from a private self-switching unit with direct connection to the local phone lines.

In businesses and, more specifically, in large public or private entities equipped with private self-switching units, most often traffic toward local phone lines is regulated. The problem, indeed, is to prevent that the self-switching unit, provided for service calls useful to the company, should serve to unduly establish private communications. The most ancient regulating provision consisted in limiting access to outside telephone lines to a reduced number of telephone sets, the others only being able to obtain local communications. The more and more widely spread use of telephone and of teleprocessing cause that limitation not to be realistic. There have been installed, therefore, self-switching units in which all of the telephone stations or almost all of them have a direct access to outside telephone lines. In that case, it becomes necessary to be able to sort work-related calls and private calls, otherwise the cost of the latter would become a heavy expense, at times a prohibitive one, for the company.

In addition, for the needs of analytical accounting, the outside telephone calls of a company need to be analyzed in order to correctly charge the different departments of the company on the basis of their respective number of calls. To achieve that end it is possible to set-up, as is done in the modern private self-switching units of hotels, a centralized accounting of the telephone charges for the account of the different departments of the company. As an example, in these systems with centralized accounting management, the charges can be centralized while recording information regarding each outgoing call, that is to say the number of the local calling station, the number of the network station called, the days, hours and minutes of the beginning and of the end of the call and the counting of the charge impulses sent back by the telephone exchange to which they are connected. These systems make it possible to sort, off-line, the business from the private calls, in order to charge the latter to the personnel of the company, but they do not guarantee the confidentiality of the private calls, something which is higly important.

In any case, the management systems used in hotels and in hospitals cannot be directly transposed to businesses. Indeed, in a hotel or in a hospital, the telephone set in one room in practice is accessible only to the patient or renter occupying that room. That is not the case in a company. There, a telephone set often is available to several people or, also, several telephone sets are connected in derivation on the same line. In order to remedy that drawback, as described in French Patent FR-A-305 075, it has been proposed for each subscriber to the private switching unit to receive a coded card and for each local set to be associated with a card decoding unit. As a function of the code read on the card, the decoding unit limits the outgoing calls, rejecting the calls from non-authorized subscribers to access the local phone lines, or the long-distance lines, or the international lines, then, for the codes that authorize those communications, it causes the data to be centralized, as indicated above. That system therefore permits a management per person rather than a management per telephone set, but it does not ensure the confidentiality or private calls.

One object of the present invention is to provide an automatic payment system that permits the personnel to make confidential private calls while paying for them in real time.

According to a characteristic of the invention, there is provided a system in which a badge managing processor can be selectively connected to the self-switching unit by local telephone lines, certain of the telephone sets of the self-switching unit being each associated with means to read a badge, with means to insulate the associated station from the self-switching unit, with means to receive a number composed on the associated station, with means to become connected, through the self-swithing device, to the above-mentioned badge managing processor, to transmit to it the data read on a badge and the number composed on the associated station, to receive from it data regarding the credit balance and the rate of the charges, and to transmit to it credit balance data, with means to transmit the composed number, with means to follow the path of the call dialed, with means to connect the associated station to the self-switching device, and with means permitting that, as a function of the charge rate and call duration data, the credit data will be lowered.

According to another characteristic, there is provided a system that comprises control circuits mounted in series on the telephone pairs of certain telephone stations, a plurality of data interface first circuits substituted for stations on telephone pairs of the self-switching device, a managing processor selectively connectable to the above-first interface circuits, each control circuit comprising first contacts in series on the line, a microprocessor, first means mounted between the microprocessor and a first line leg located between the first contacts and the associated station, selectively capable of checking the condition of the station, of feeding the above-mentioned first leg, of transmitting tones on that first leg, and of receiving the multifrequency dialing tones of the above-mentioned first leg, a first relay for the actuation of the above-mentioned first contacts fed by the microprocessor, second means mounted between the microprocessor and a second line leg located between the first contacts and the self-switching device and selectively capable of selectively receiving from that second line leg multifrequency dialing tones, of coupling with that second line leg a switchable impedance and of transmitting data from the microprocessor to that second line leg, a badge reading unit, the above-microprocessor including means to enter in connection, through the self-switching unit, with one of the first interface circuits, means to record the data read on a badge by means of the badge reading unit, and to transmit them to the above-mentioned managing processor connected to the above-mentioned first interface circuit.

According to another characteristic, the system further includes badge distributors that can be connected to the above-mentioned managing processor through the self-switching unit.

The characteristics of the above-mentioned invention, as well as others, will appear more clearly upon reading of the following description of embodiments, that description being given in relation to the attached drawings in which.

Figure 1:
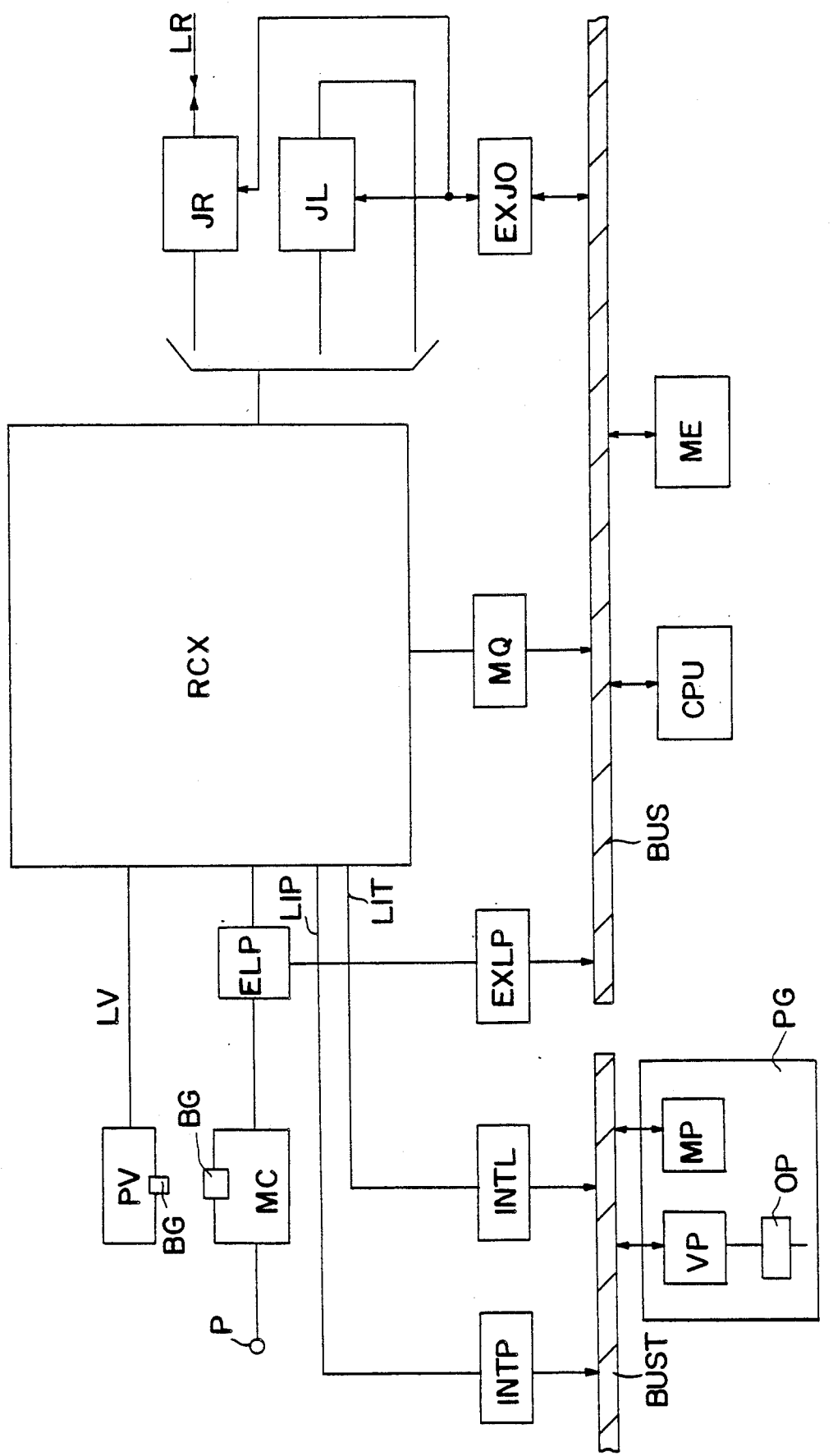
FIG. 1 is a block diagram of a telephone self-switching unit with a system for automatic payment of telephone calls, according to the present invention.

The private self-switching unit, represented in FIG. 1, is a self-switching unit with centralized command that classicaly includes:

An RCX connection network,

A plurality of connected equipment of the station line ELP, connected on the one hand, on the first side of the RCX connection network and, on the other hand to telephone stations P by means of local lines LL.

A plurality of network junctors JR connected on the one hand to the second side of the RCX connection network and, on the other hand, to a public connection exchange, not shown, by network lines LR.

A plurality of local junctors JL the inputs and outputs of which are connected to the second sides of the RCX network.

An equipment exploring device EXLP connected through command lines to the line equipments ELP.

A junctor exploring device EXJO connected by command lines to the network junctors JR and to the local junctors JL, A centralized command unit (CPU) also called central unit, made up of a microprocessor, for example.

A memory Me that classically stores the permanent, semi-permanent and temporary data necessary to the operation of the self-switching unit.

A marker MQ capble of creating routing between the two sides of the RCX connection network under command of the central CPU unit, and A bus BUS on which take place, among others, the processing connections, first between the explorers EXLP and EXJO on the one hand and the central CPU unit on the other hand, second, between the central CPU unit and the memory ME and, third, between the central CPU unit and the marker MQ.

There will be given only briefly an example of operation of a classical self-switching unit that includes the above-mentioned circuits. The other cases of operations will not be described as they are obvious to those skilled in the art. When the receiver of a telephone set P is taken down, the line equipment ELP to which it is connected changes state, something that is recognized by explorer EXLP. The explorer EXLP signals the change of state to the central CPU unit. The dialing invitation tone is sent to the calling set P and the dialing is recorded in memory ME. The central CPU unit recognizes, from the number recorded in memory ME, whether that is a local or an outside call. In the first case, the central CPU unit acts on a local communication junctor JL and causes the setting up, in the RCS connection network, on the one hand of a routing between the calling line LL and the designated local junctor JL and, on the other hand, a routing between the designated local junctor JL and the called local line. It causes the called line to ring under the action of junctor JL and, when the called station answers, it sets up the connection between the two routes in junctor JL. In the second case, the central CPU unit acts on a communication junctor JR of the network, causes the setting up of a connection path between that junctor JR and the local calling line and, through that junctor JR, causes the corresponding network line LR to the state of calling line toward the remote central exchange. It would be possible to go over the cases of occupied lines, etc., but that would be useless for those skilled in the art. It is of course understood that the above self-switching device has been described only as an example. The system according to the invention can be adapted to self-switching units having different structures.

According to the invention, the self-switching unit that has just been described is completed on the following manner. Certain telephone stations P at least are respectively associated with control modules MC that are mounted in series on the telephone pairs LL of those stations. Besides, among the local LL lines, a first plurality of LIT lines are respectively connected to first interface circuits INTL, and a second plurality of LIP lines are respectively connected to second interface circuits INTP. The INTL and INTP interfaces are connected to a second bus BUST to which is connected a managing processor PG. The managing processor PG preferably is comprised of a microprocessor CP and of a memory MP, and it is associated to an operator keyboard OP. Finally, among the local lines LL, a third group of lines LV are respectively connected to pre-paid badge distribution stations PV. In the example of execution illustrated in FIG. 1, it has been assumed that a line LV can be connected only to one interface circuit INTP, called payment interface circuit. That is why no line equipment ELP is appearing on the line LV, but obviously there can be one. In the same manner, the lines LIT and LIP that only serve to receive calls are shown without any equipment on the line.

In practice, the INTL interfaces, called taxation interfaces, may be about ten in number for example, and the payment interfaces INTP may be two or three in number.

Before describing in detail the MC, INTL, INTP, PG and PV circuits, the general lines of operations of the system according to the invention will now be described briefly. Each person authorized to use the self-switching unit, that is to say, in a company, any member of the personnel, of the supervisory personnel or executive personnel can turn to a distribution station PV and, against payment of a certain amount, obtain a badge BG bearing a unique identification work and giving access to a memory into which the amount received by the distribution station PV has been stored at the time of delivery of the badge.

The control circuit MC has a slit that permits the introduction of a badge BG. The user is free to introduce his badge into it, or not to introduce it, before each telephone call. In both cases, every time the receiver of station P is taken down to cause a call, the station P immediately is isolated from the self-switching unit by the control circuit MC, before the user dials the calling number of the station he wishes to call. Once the number has been dialed, the circuit MC performs an analysis of that number. Depending on the result of this analysis, it concludes that the communication requested does or does not require the introduction of a badge. When the badge is necessary, the user is notified of it. At the end of a certain period of time, if the user has not introduced any badge, the circuit MC sends him the occupied tone. Of course, the user may also have introduced his badge prior to taking the receiver down and, in that case nothing is asked of him.

Afterwards, the control circuit MC is put in contact with the managing processor PG to transmit to it, through the RCS connection network and the interface INTL, the number of the badge BG, its own identification number and the telephone number of the station called. The managing processor PG analyzes the number asked for, it calculates the corresponding charge rate and makes up a message containing the value of that rate, the credit balance of the badge and, possibly, the authorization of access to the number asked for. That message is transmitted to the control circuit MC and, immediately upon the end of the message, the connection between the managing processor unit PG and the control circuit MC is released.

When the call toward the requested number is authorized and free, the control circuit MC puts itself to rest and only checks the end of the call. When the call is a paying one, after the call has normally taken place, and at the end of the communication, the control circuit MC, that has counted down as a function of the charge rate information and of the time lapsed, the charges actually used during the conversation, is again connected to the managing processing unit PG to have recorded into the memory MP the new credit balance of the badge BG. If, during the conversation, the credit balance of the badge BG were to reach zero, the command circuit MC releases the communication after having warned the user.

Figure 2:
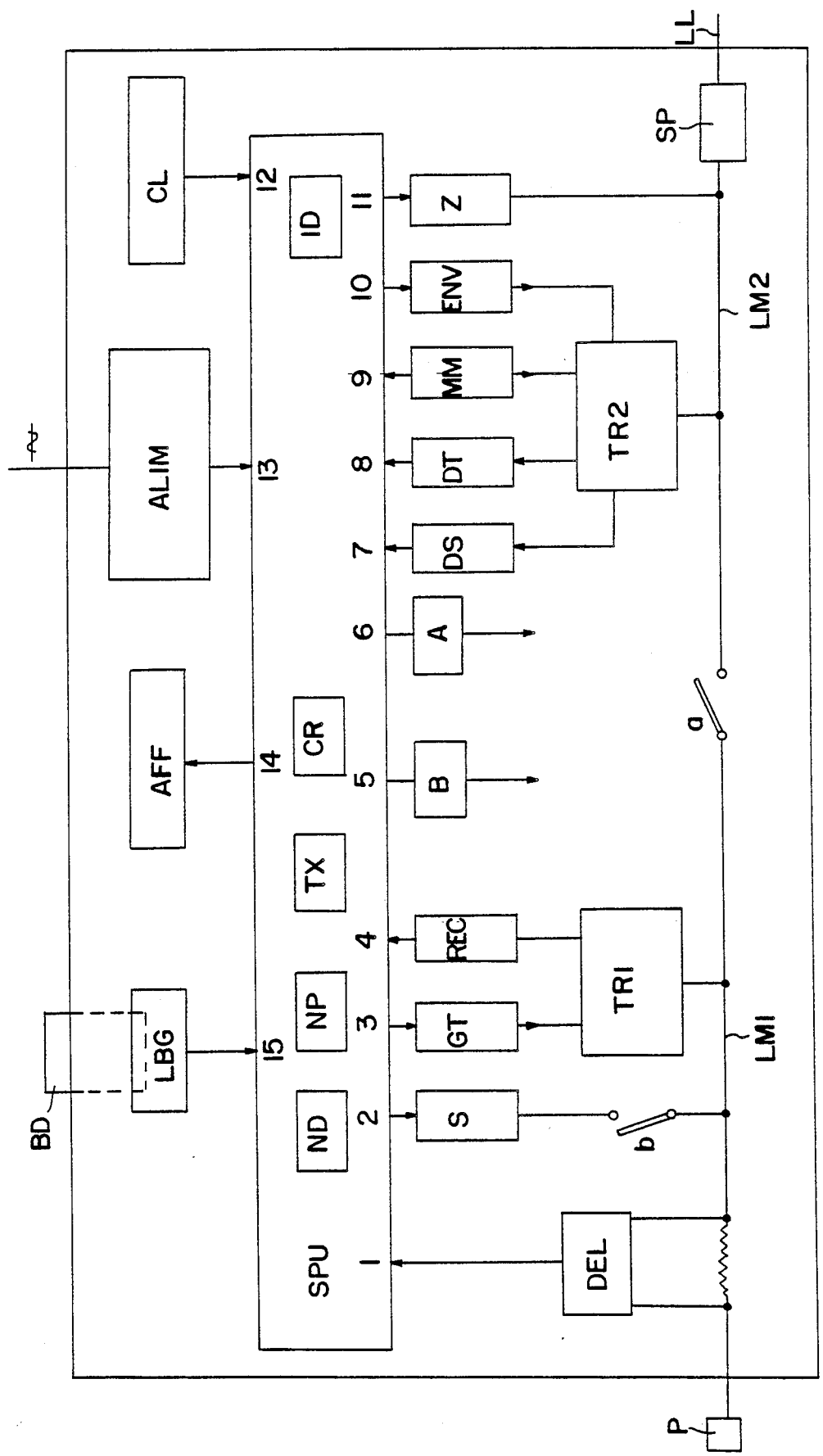
FIG. 2 is a block diagram of the interface of a control module used in the self-switching unit in FIG. 1.

In FIG. 2, there has been illustrated a command circuit MC mounted in series on a local line LL of a telephone station P. More specifically, in series on the wires of the line LL there are mounted, starting from the station P, two resistance R, two work contacts a and a polarity checking box SP. The line leg between the resistances R and the contacts a is designated as LM1, while the other line leg between the contacts a and the circuit SP is designated as LM2.

The control circuit MC includes a secondary command unit SPU, two selective switches TR1 and TR2, a badge reading device LBG, a posting device AFF, a feeding circuit ALIM connected to the main supply line, a clock CL, a tone generator GT, a ring=detecting device DS, a source of current S, a switchable impedance Z, a line condition detector DEL, a number receiving unit REC, a number sending unit ENV, a tone detector DT, a modem MM and two relays A and B.

The command unit SPU preferably is a microprocessor in the memory of which several zones can be distinguished, one of which, zone ND is meant to memorize the number of the station asked for, one zone NP meant to memorize the local number of the interfaces INTL, a zone TX meant to memorize the rate of the charges, a zone CR meant to memorize the credit balance of a badge, and a zone ID that contains the identification number of the circuit MC.

The selective switch TR1 is connected on one side to the line leg LM1 and, on the other side, it is connected to the output of the tone generator GT and to the input of the receiver REC, respectively.

On the terminals of one of the resistances R there is mounted a line condition detector DEL that measures the current on it. The detector DEL may be formed, in a classical manner, of a circuit with differential amplifiers. The output of detector DEL is connected to the terminal 1 of the SPU unit.

The output terminals of the source of current S are connected to the line leg LM1 by two work contacts b while input terminals are connected to the terminals 2 of the SPU unit. The source S serves to apply to station P the same voltage as the self-switching unit as soon as the contacts a are open. The current source S is fed, through the unit SPU, from the ALIM circuit.

The tone generator GT has its command input connected to terminal 3 of the SPU unit, and it develops, as a function of the signal applied to terminal 3, the following tones: tones of local long distance and international operation, tone of routing, tone of call return, occupied tone. Those different tones similate the tones that the self-switching unit delivers to the stations not having any control circuit MC or when their control circuits MC are out of service. In practice, the tones developed by the generator GT may be different from the real tones transmitted by the self-switching unit, so that the user might better follow the progression of his call.

The number receiving unit REC, the output of which is connected to the terminal 4 of the SPU unit, serves to recognize the numbers dialed and that are transmitted in classical multifrequency codes, for example.

The energizing coils of the relais A and B are respectively connected to the terminals 5 and 6 of the SPU unit.

The selective switch TR2 is connected on one side to the line leg LM2 and on the other side it is connected respectively to the output of sending unit ENV and to the input of the ring detecting unit DS, to the input of the tone detector DT and to the terminals of the modem MM.

The ring detector unit DS is a circuit capable of recognizing a ring signal sent by the self-switching device on the line LL. Its output is connected to the terminal 7 of the SPU unit.

The tone detector DT is a circuit capable of recognizing the different tones of operation, of routing of occupation, of call return that are transmitted through the self-switching unit. Its output is connected to the terminal 8 of the SPU unit.

The modem MM is capable of exchanging messages with the managing processor unit PG, through interface INTL and the self switching unit, and of transmitting or receiving messages to or from the terminal 9 of the SPU unit.

The sending unit ENV is a circuit capable of translating into multifrequency code the digits that are transmitted to it by terminal 10 of the SPU unit.

The switchable impedance Z has its output connected to the line leg LM2 and it is capable of assuming several values, depending on the command signals transmitted to it by the terminal 11 of the SPU unit.

The clock circuit CL delivers to terminal 12 of the SPU unit the clock signals necessary for its operation, for example those that permit it to obtain one impulse per second from the start of a conversation, or also those that permit it to cause time-markings to function which, when they are exceeded, cut off the current to relay A.

The ALIM circuit is supplied current by the mains for example, under 220 V alternating, and it delivers all of the direct voltages necessary for the operation of the SPU unit, through terminal 13, and for the operation of all of the other elements ofthe control circuit. Specifically, it delivers the voltage used in source S. The ALIM circuit may further include a buffer battery that, in a classical manner, compensates for the short current interruptions.

The posting unit AFF is a panel that has indicator lights and/or an alphanumerical posting screen that, for example, enables the user to be informed in real time of his credit, and to read indications such as, for example, "introduce your badge" or "the credit of your badge is running out, hang up". The posting device can also post his credit balance in real time. It receives the informations to be posted through terminal 14 of the SPU unit. That device can be completed by buzzing devices or other sound menas that attract the attention of the user.

The badge reading unit LBG comprises the slit into which the user can introduce a badge BG. It contains the circuits capable of reading all of the electronic, optical or magnetic information carried by that badge, and to transmit them to the SPU unit through terminal 16.

Finally, the SP circuit is a circuit with diodes, that prevents any poor functioning in case of reverse polarities applied to the line LL.

There will now be described examples of operation of the system according to the present invention. In its rest position, the control circuit MC being supplied current and in condition of operation, the relay B is working to feed station P, but relay A is at rest. In case of a breakdown or of non-feeding, the relay B is at rest, the station P cannot be used.

At rest, the SPU unit constantly checks the state of the line condition detector DEL and of the ring detector DS. Besides, the impedance Z is siwtched so as to simulate a station at which the receiver has been hung up, as far as the equipment of the ELP line is concerned.

If the station receives a call, the ring detector DS warns the SPU unit which releases the relay B and feeds relay A. The contact a, that is closed, enables the ring signal to reach the station P until the user takes down the receiver. The SPU unit is still checking the detector DEL so that, as soon as the receiver of station P has been hung up, the control circuit will be switched to rest.

When the station P is the calling station by taking down the receiver, the detector DEL informs the SPU unit of it, the latter then activates the generator GT which delivers the operation tone to the station P. The user dials the number of the requested station and, immediately upon receiving the first digit in receiver REC, the generator GT is put to rest. Then the SPU unit analyzes the number dialed, each digit received in the receiving unit being, once it has been translated, transmitted to the SPU unit. Analysis, therefore takes place as the digits come in and the SPU unit decides on the end and on the nature of the dialing. For example, in the case of a call toward the international network (call signal 19), immediately upon receiving the second digit the SPU unit has generator GT send a new operation tone. In all cases, immediately upon the end of the dialing, the generator GT transmits the routing tone.

Depending on the number recorded in the zone ND, the SPU unit determines whether or not it must consult a badge. For a local call, for example, the badge is not necessary. When the badge is necessary and it is absent, the SPU unit orders the posting of the request for badge through the AFF unit. After a certain length of time, if no badge is introduced, the generator GT transmits the occupied tone. The SPU unit recognizes the presence of the badge in the reader LBG, it requests the reading of that badge and, knowing the content of the badge and number that has been called, it decides whether or not it must consult the managing processor unit.

When consultation of the managing processor unit PG is necessary, the SPU unit switches the impedance Z so that the latter will simulate a taking down of the receiver as far as the equipment on the line ELP is concerned, the detector DT recognizes the operation tone coming from the self-switching unit, the SPU unit causes sending unit ENV to send the number that it is memorizing in the zone NP, that is to say the number of a line LIT. The detector DT that is checking the tone of return call recognizes the uncoupling of an interface INTL. The modem MM then is connected and it serves to the sending by the SPU unit, of a message that comprises the identification number of the control circuit MC, the number of the station dialed, and the informations contained in the badge BG. The processor PG treats those information and sends back to the SPU unit, through the modem MM, the authorization of letting the call go through, the credit balance of the badge, and the rate for the charges to be used. The SPU unit then switches the impedance Z to simulate a hanging up of the receiver, something that frees the line LL and indicates to the processor PG that the message has been received.

If the call is not authorized, there is found again the preceding case in which the badge is asked for but not introduced.

If the call is authorized, the SPU unit switches the impedance Z to similate a new uncoupled state, the detector DT detects the operation tone and the SPU unit has sending device ENV send the number memorized in the zone ND. The detector DT informs the SPU unit of the routing of the call. If the dialed number is occupied, the GT generator sends the occupied tone to the user and the control circuit comes back to rest. If the dialed number answers, the detector DT detects the end of the call return tone, this starting in the SPU unit the feeding of relay A, the release of relay B and the charging of the taxes in the zone TX. The detectors DEL and DT check the hanging up done by the caller or by the party called to end the call and stop the charges.

At the end of the call, the SPU unit again switches impedance Z to sim late a last uncoupling and it connects with the managing processor unit PG, as previously. Through the modem MM, the SPU unit transmits to the managing processor PG the new balance credited to the badge. Finally, the control circuit MC releases the line LL and comes back to its rest position.

In the case when the call is authorized and is free, the operation is the same as for the call to the requested number, but, immediately upon the end of the call, the control circuit comes back to its rest position, without connecting anew with the managing processor unit.

Figure 3:
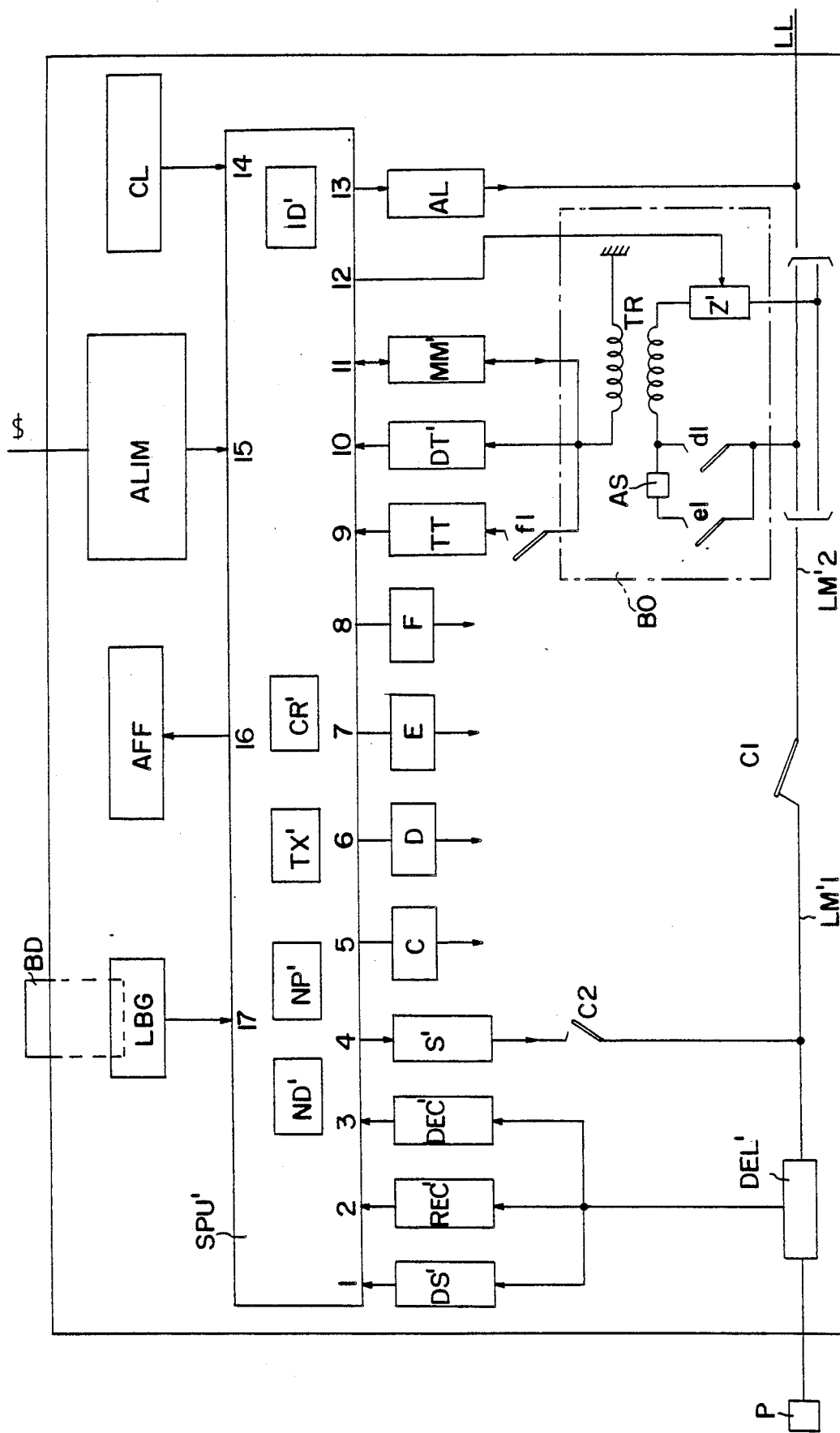
FIG. 3 is a block diagram of a variation in the interface in FIG. 2.

In FIG. 3 there has been illustrated a command circuit MC', that is a variation of the circuit MC in FIG. 2. The circuit MC' is mounted in series on a local line LL of a telephone station P. In series on the lines LL are mounted two photo-coupling units, not shown, that are part of a line condition detector DEL', and two rest contacts cl. The line leg between the photo-coupling units of the circuit DEL' and the contacts cl is designated as LM'1 while the other line leg between the contacts cl and the line LL is designated as LM'2.

The control circuit MC' includes a secondary command unit SPU', a badge reading unit LBG, a posting unit AFF, a feeding circuit ALIM connected to the mains, a clock CL, a feeding source S', the line condition detector DEL', a ring detector DS', a number receiving unit REC', a self-feeding circuit DEC, four relays C, D, E and F, an isolating circuit BO, a tone transmitting unit TT, a done detector DT', a modem MM' and a self-feeding circuit AL.

The command unit SPU' is formed of a microprocessor in the memory of which it is possible to distinguish several zones, one zone of which ND' meant to receive the number of the called station, a zone NP' meant to momerize the local number of the interfaces INTL, a zone TX' meant to memorize the rate, a zone CR' meant to memorize the credit balance of a badge, and a zone ID' that contains the identification number of the circuit MC'.

The detector DEL' is, in this embodiment, formed of a classical circuit with photo-coupling units of the type 4A35, and that has its output connected to the inputs of the circuits DS', REC' and DEC, the outputs of which respectively are connected to the terminals 1, 2 and 3 of the SPU' unit.

The number receiving unit REC' the output of which is connected to the terminal 2 of the SPU' unit serves to recognize the digits formed and transmitted in classical multifrequency code, for example. The ring detector DS' is a circuit capable of recognizing the working and non-working periods of a signal sent by the self-switching device to the line LL. Its output is connected to the terminal 1 of the SPU' unit. The uncoupled condition detector DEC' recognizes the condition of the line and it has its output connected to terminal 3 of the SPU' unit. The three circuits DS', REC' and DEC' have been illustrated separately for a better understanding of the functions of the circuit MC', while in practice the circuit DEL' may be directly connected to the SPU' unit the software of which makes it possible to analyze the different periods of rest and of work of the signals sent or received on the line leg LM'1 in order to determine whether this is an uncoupling, a ring signal or dialing signals.

The source S' plays the same part as the source S in FIG. 2 and it is connected on the one hand to the line leg LM'1 through the work contact c2 and, on the other hand, to terminal 4 through unit SPU'.

The energizing coils for the relays C, D, E and F are respectively connected on the one hand to the terminals 5, 6, 7 and 8 of the SPU' unit and, on the other hand, to a source of potential fed by the SPU' unit.

The isolating circuit BO is formed by an isolation transformer TR the primary of which has a terminal connected to a wire of the line leg LM'2, through a switchable impedance Z', and has its other terminal connected to the second wire of the line leg, by a work contact dl. In parallel on contact dl there is mounted a work contact el in series with a sparkblowout AS. A secondary terminal of the transformer TR is connected to the ground while its other terminal is connected to the input of the circuit TT, through a contact fl, to the input of the circuit DT' and to the modem MM'. The governing input of impedance Z' is connected to the terminal 12 of the SPU' unit.

The circuit AL is a self-feeding circuit connected on the one hand to the line wire LL and, on the other hand, to the terminal 13 of the SPU' unit. That circuit is provided to feed the SPU' unit from the current transmitted by the wires of the line. It can work in parallel on the ALIM circuit, or in place of the latter, something that prevents the need to connect the circuit MC' to the main line.

The tone transmitting circuit TT is a circuit capable of having retransmitted, through the SPU' unit, the tones received from the line toward the terminal 4 of SPU' and source S'. The output of the circuit TT is connected to the terminal 9 of the SPU' unit.

The tone detector DT' is a circuit capable of recognizing the different tones of operation, of routing, of occupied station, of call return that are transmitted through the self-switching unit. It has its output connected to the terminal 10 of the SPU' unit.

The modem MM' is capable of exchanging messages with the managing processor unit PG, see FIG. 1, through the interface INTL and the self-switching unit, and of transmitting or of receiving messages from terminal 11 of the SPU' unit.

The clock circuit CL and the feeding circuit ALIM are respectively connected to the terminals 14 and 15 of the SPUΔ unit, and they can be identical with circuits CL and ALIM in FIG. 2.

The circuits LBG and AFF, that also may be identical with those shown in FIG. 2, are respectively connected to the terminals 17 and 16 of the SPU' unit.

There will now be described a few examples of operation of the control circuit MC' shown in FIG. 3. In its rest position, the circuit MC' being supplied current and in condition of operation, the relay C is put to rest and the relays D, E and F are working. In case of a breakdown or of non-feeding, the relay C being at rest, the station P remains supplied with current and therefore is usable.

At rest the SPU' unit constantly checks the state of the line condition detector DEL through a circuit DEC. Besides, the impedance Z is connected to line leg LM'2 by B O and dl at work, and it simulates a re-coupled station as far as the line equipment ELP is concerned.

When the station is called, the circuit DS alert the SPU' unit which puts relay D to rest. Besides, the closed contact al allows the signal to reach the station P until the user uncouples. The SPU' unit is still checking the circuit DEL through DEC and immediately upon the re-coupling of the station, the circuit MC' is put to rest.

When the station P is calling by taking down the receiver, the detector DEL informs the SPU' unit of it, through the circuit DEC, and the SPU' unit activates the relais C and D. The station P remains fed by contact c2 that is closed, and it receives from source S' the operation tone of source S'. The contact d1 which is closed applies the impedance Z' of the circuit to the wires of the line LL.

The user dials the number of the called station and, immediately upon receiving the first digit in receiving unit REC, it stops the sending of the tone that invites the dialing. Then the SPU' unit analyzes the number that has been dialed. At the end of the dialing, the SPU' unit reaches decisions similar to those that the SPU unit was reaching in the circuit shown in FIG. 2.

In the case when the call is accepted, the number can be retransmitted toward the self-switching unit by acting on relay C in the manner of a dial. In that case relay E is put to work to put into the circuit the contact protection circuit AS.

When tones are received in the self-switching device, the relay F being working, the retransmitting unit TT extends their transmission toward the source S' and the station P.

Those skilled in the art will be able to go back to the already described examples of operation, given in relation to circuit MC shown in FIG. 2, to illustrate other cases of operation with circuit MC'.

As already indicated, there are also provided badge distributors PV, shown in FIG. 1. Each distributor PV contains a coding-decoding device for badges given out or paid for, a posting device, possibly a keyboard, a money receiving unit, a printer, a microprocessor and a modem. To obtain a credit on the badge requires payment of an amount which may be a set amount or not. A dialog is initiated, via a modem connection toward the interface INTP, between the microprocessor of the distributor and the managing processor unit PG, in order to define the identification code of the badge. This code can be completed by a personal identification number that the user writes on the keyboard of the distributor. The microprocessor of the distributor then ensures, by its coding-decoding device, the recording of the badge identity, then it communicates to the managing processor the credit resulting from the amount received into the money receiving unit. The managing processor PG thus can ensure a centralized management of the accounts and deliver credit vouchers.

Of course, depending on the type of company in which the system according to the present invention is meant to be used, variations are possible. Thus, it is possible to provide for contact a to be a rest contact instead of a work contact, so that in the absence of current the station can put through emergency calls.

In the above description, the station P and the associated control circuit MC have been presented as two separate entities, but it is possible, in practice, to integrate the control circuit into the station.

I claim:

1. A system for the automatic payment of telephone calls made from the telephone stations of a private self-switching unit, with direct connection to the main line, characterized in that, in said system, a badge managing processor unit (PG) can be selectively connected to the self-switching unit by local telephone lines (LIT), certain of the telephone stations (P) of the self-switching device being each associated with means (MC) for reading a badge, for isolating from the self-switching device the associated station (P), for receiving a number dialed on the associated station, means to become connected, through the self-switching device, to said badge managing processor unit (PG), to transmit to it the data read on a badge (BG) and the number dialed on the associated station (P), to receive from it data of credit balance and of taxation rates, and to transmit to it balance credit data, to transmit the number dialed, to follow the routing of the call asked for, to connect in a galvanic manner the associated station (P) with the self-switching device, and means that, as a function of the taxation rate and the length of the call, will lower the credit data.

2. A system according to claim 1, characterized in that it comprises control circuits (MC) that are mounted in series on the telephone pairs (LL) of certain telephone stations (P), a plurality of first data interface circuits (INTL) substituted for stations on telephone pairs (LIT) of the self-switching device, a managing processor unit (PG) selectively connectable to said first interface circuits (INTL), each control circuit (MC) comprising first data interface in series on the line (LL), a microprocessor (SPU), first means mounted between the microprocessor (SPU) and a first line leg located between the first contacts and the associated station, capable of selectively checking the state of the station (DEL), of feeding (S) said first leg, of transmitting (GT) tones on said first leg and of receiving (REC) the multifrequency tones of dialing from the first leg, a first relay (A) for the operation of said first contacts (a) fed by the microprocessor (SPU), second means mounted between the microprocessor (SPU) and a second line leg located between the first contacts (a) and the self-switching device and capable of selectively receiving (DS) from said second leg the ring signal, tones (DT), of sending (ENV) to said second leg multifreuqency dialing tones, of coupling to said second leg a switchable impedance (Z) and of transmitting (MM) data from the microprocessor to said second leg, a badge reading unit (LBG) said microprocessor (SPU) having means to establish contact through the self-switching device, with one of the first interface circuits, means to record the data read on a badge by means of the badge reading unit, and to transmit them to said managing processor unit connected to the first interface circuit.

3. A system according to claim 1 or 2, characterized in that it comprises also badge distributing units (PV) that can be connected to said managing processing unit (PG) through the self-switching unit.

* * * * *